Philip S. Williams — Inventor

Nov. 12, 1957   P. S. WILLIAMS   2,812,996
RECTILINEAR TORQUE DRIVEN RECORDING PEN
Filed Aug. 11, 1954   2 Sheets-Sheet 2

Philip S. Williams   Inventors
By [signature]   Attorney

United States Patent Office 2,812,996
Patented Nov. 12, 1957

2,812,996

RECTILINEAR TORQUE DRIVEN RECORDING PEN

Philip S. Williams, Tulsa, Okla., assignor to Esso Research and Engineering Company, a corporation of Delaware Application August 11, 1954, Serial No. 449,076

6 Claims. (Cl. 346—112)

The present invention relates to an apparatus for making a high fidelity rectilinear recording of curvilinear motion. The invention is particularly concerned with a high frequency response apparatus that is adapted to making a pen recording of electrical impulses. The apparatus of this invention makes use of the principle that the axle of a wheel that is caused to roll on a straight line without slipping will move in a straight line through a distance that is exactly proportional to the angle of rotation of the wheel about its own axis.

The use of pen recorders for the recording of electrical signals is of course well known. In the past, pen recorders have been used principally in applications where no particular disadvantages resulted from poor frequency response of the recording apparatus or from the fact that a torque driven pen makes a curvilinear record rather than a rectilinear record. Previous attempts to adapt curvilinear pen recorders to rectilinear recording have required such modification of the pen that the added weight impaired the response of the recorder to high frequency signals, e. g. those above 20 cycles per second, while at the same time increasing the power needed to drive the pen through an adequate amplitude for proper recording of the desired information.

It is one object of the present invention to provide a simple light weight rectilinear pen recorder having good high frequency response and introducing no nonlinearity or amplitude distortion.

In accordance with the present invention a conventional torque driven pen recorder is provided in which a rigid arc segment is caused to roll on a straight line surface by the torque applied by the pen motor in such a manner that a recording pen fastened to the arc segment will move in a straight line in proportion to the rotational motion of the arc segment.

The nature of the invention can be more readily understood when reference is made to the accompanying drawing in which.

Figure 1:
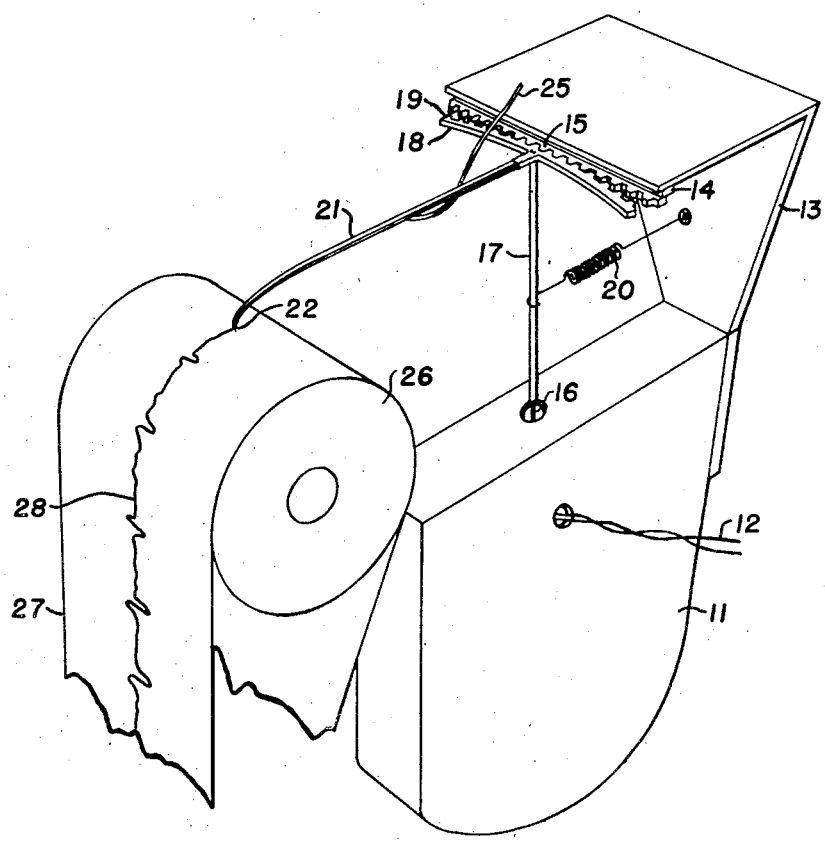
Figure 1 is a perspective view of the essential portions of one form of the invention.

Referring now to Figure 1 the outer case 11 of a conventional recording pen motor is shown with leads 12 supplying electrical signals to the pen motor. Fastened to the case 11 is a generally L-shaped bracket 13 to the outer free edge of which is fastened a guide bar 14 provided with gear teeth 15. An arc segment 18 to which is fastened at right angles a pen driving arm 17 is provided with teeth 19 that mesh with the teeth 15 of the guide bar. Driving arm 17 is connected at its free end to the shaft 16 of the pen motor and the arc segment 18 is held in meshing engagement with the guide bar 14 by means of a spring 20 that is fastened at one end to the bracket 13 and has its other end looped around the pen driving arm 17.

Arc segment 18 is so arranged that it constitutes a portion of the circle that lies in a plane at right angles to the axis of rotation of the pen driving arm. Fastened to the arc segment in such a manner that it is positioned essentially within the plane of the circle just mentioned is a conventional hollow recording pen 21 whose length is so chosen that the point 22 of the pen is positioned essentially at the center of the defined circle. A flexible tube 25 supplies ink to the pen from a suitable reservoir (not shown). A roller or drum or other suitable means 26 is so positioned with respect to the recording apparatus that it will feed a recording medium such as the paper 27 past the recording pen to receive a trace 28 thereon.

Figure 2:
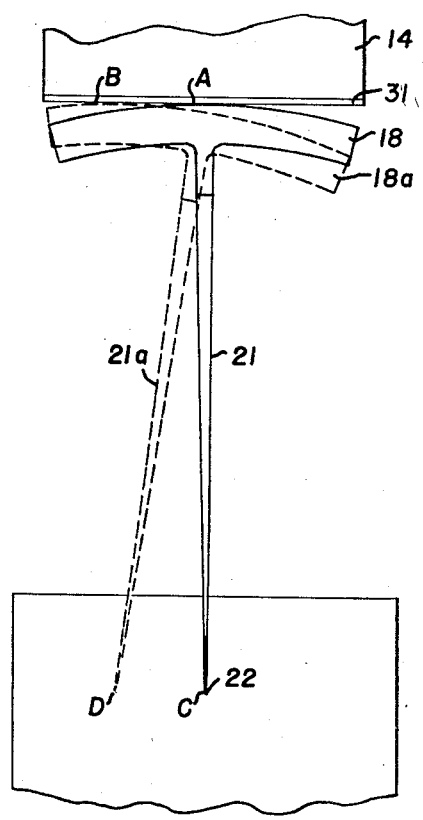
Figure 2 is a schematic diagram illustrating the relative motion of the pen point and the arc segment.

Instead of using the teeth shown in Figure 1 slippage between the arc segment and the guide bar may also be prevented by applying a slip resistant coating of rubber or equivalent material 31 to the contact surface of either the guide bar or the arc segment as shown in Figure 2. In some instances the materials of which the members are made may of themselves offer enough friction to prevent slippage.

The principle upon which the apparatus of this invention operates is diagrammatically illustrated in Figure 2. When the shaft of the pen motor is rotated by a signal fed to the pen motor the arc segment 18 will be caused to roll along the guide bar 14, the arc segment then being moved to the position shown by the dotted lines 18a. At the same time the pen 21 will have shifted from the position shown in solid lines to the position shown by the dotted lines 21a. The point 22 of the pen will move in a direction parallel to the edge of the guide bar from position C to position D. A line drawn from C to D will be parallel to the edge of the guide bar because the arc segment in the shifted position will contact the guide bar at point B and because, inasmuch as the points on the circumference of a circle are equidistant from its center, the distance B—D when the pen is in the position shown with dotted lines must equal the distance A—C when the pen is in the position shown with full lines.

It is thus clear that the recording pen of this invention utilizes the principle that the axis of a wheel that rolls on a straight line without slipping moves in a straight line that is parallel to the first mentioned line through a distance exactly proportional to the angle of rotation of a wheel about its own axis.

Figure 3:
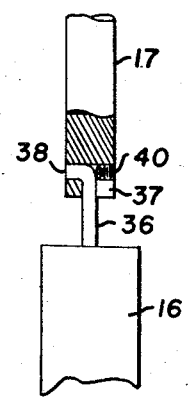
Figure 3 is an enlarged view of a portion of the apparatus showing the manner of linking the pen motor to the arc segment.

It will be noted that the pen driving arm 17 is fastened to the arc segment at a point adjacent the outer periphery of the arc segment. By applying the torque to the arc segment in this manner the point at which the arc segment is fastened to the pen driving arm 17 shifts laterally only a slight amount for angles of rotation up to about ±15°. This slight shift is easily absorbed because of the flexibility of the pen driving arm and of the manner in which the latter is coupled to the shaft of the pen motor. As shown in Figure 3 the upper portion of the pen motor drive shaft 16 terminates in a pin portion 36 bent at right angles at its upper end. The upper end of pin 36 fits within a slot 37 cut part way through the lower end of driving arm 17 and extending up to a hole 38 bored through the driving arm. The slot 37 is of slightly less width than the diameter of hole 38. A short portion of hole 38 is tapped to receive a set screw 40 that presses against the pin 36 to hold it in place. With hole 38 drilled in the same direction as pen 21 it will be seen that the bent portion of pin 36 can act as a bearing on which driving arm 17 can turn to permit the lateral shift referred to, that is, the shift of the point at which the arc segment 18 is attached to driving arm 17.

As a practical example of the invention a recording device of the type described has been built and successfully operated in which a pen driving arm 17 having a length of about 1⅝ inches and a pen 21 having a length of about 3½ inches were used, the arc segment 18 and the guide bar 14 each being approximately 1½ inches long.

What is claimed is:

1. A device for recording curvilinear motion as a rectilinear record comprising: a rigid arc segment representative of a portion of the rim of a wheel, an elongated pen fastened to said arc segment in a manner positioning the point of said pen at essentially the hub of said wheel, a fixed straight line rigid surface, means holding the outer edge of said arc segment in contact with said rigid surface, means for rolling said arc segment along said rigid surface in proportion to said curvilinear motion, and means for moving a record medium past said pen point and in contact therewith.

2. A device for recording curvilinear motion as a rectilinear record on a moving recording paper comprising, in combination: motor means adapted to provide a rotational motion in response to a primary impulse representative of a quantity to be recorded, an elongated pen driving arm connected at one end to said motor means for rotation thereby, a rigid arc segment fastened to the remaining end of said pen driving arm, the outer curved surface of said arc segment constituting a portion of a circle lying in a plane at essentially right angles to the axis of rotation of said pen driving arm, an elongated pen fastened to said arc segment and arranged essentially within said plane, the recording point of said pen being positioned at essentially the center of said circle, means for moving a record medium past said recording point and in contact therewith, a fixed straight guide bar engageable with the outer curved surface of said arc segment and means for maintaining said arc segment in contact with said guide bar, whereby said arc segment will roll along said guide bar.

3. Device as defined by claim 2 including teeth along the edge of said guide bar and meshing teeth on the outer curved surface of said arc segment whereby to prevent slippage of said segment along said guide bar.

4. Device as defined by claim 2 including at least one friction-resistant surface between said guide bar and said arc segment.

5. Device as defined by claim 2 wherein said means maintaining said arc segment in contact with said guide bar comprises a spring.

6. Device as defined by claim 2 wherein said arc segment is fastened to said pen driving arm at a point adjacent the outer periphery of the arc segment.

References Cited in the file of this patent

UNITED STATES PATENTS

| 1,113,747 | Boyden | Oct. 13, 1914 |
| 2,534,569 | Bowditch | Dec. 19, 1950 |
| 2,606,093 | Reason | Aug. 5, 1952 |

FOREIGN PATENTS

| 790,754 | France | Nov. 27, 1935 |